Figure 1:
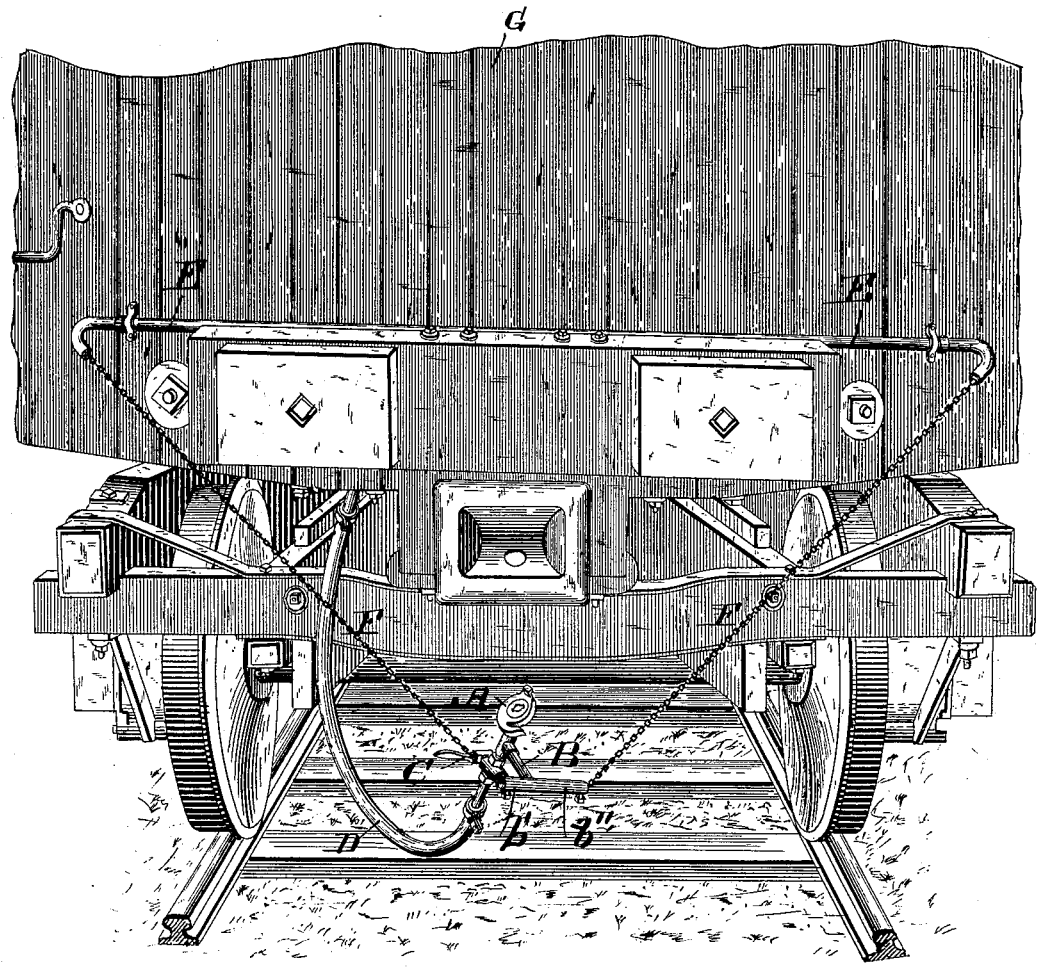

(No Model.) 2 Sheets—Sheet 1.

F. DU MONTIER.
PIPE COUPLING AND COUPLING ATTACHMENT FOR RAILWAY CARS.

No. 482,304. Patented Sept. 6, 1892.

ATTEST.
J. Henry Kaiser
Joseph C. Stack.

INVENTOR.
Fred. DuMontier,
By Geo. A. Shepard
Atty.

(No Model.) 2 Sheets—Sheet 2.
F. DU MONTIER.
PIPE COUPLING AND COUPLING ATTACHMENT FOR RAILWAY CARS.
No. 482,304. Patented Sept. 6, 1892.
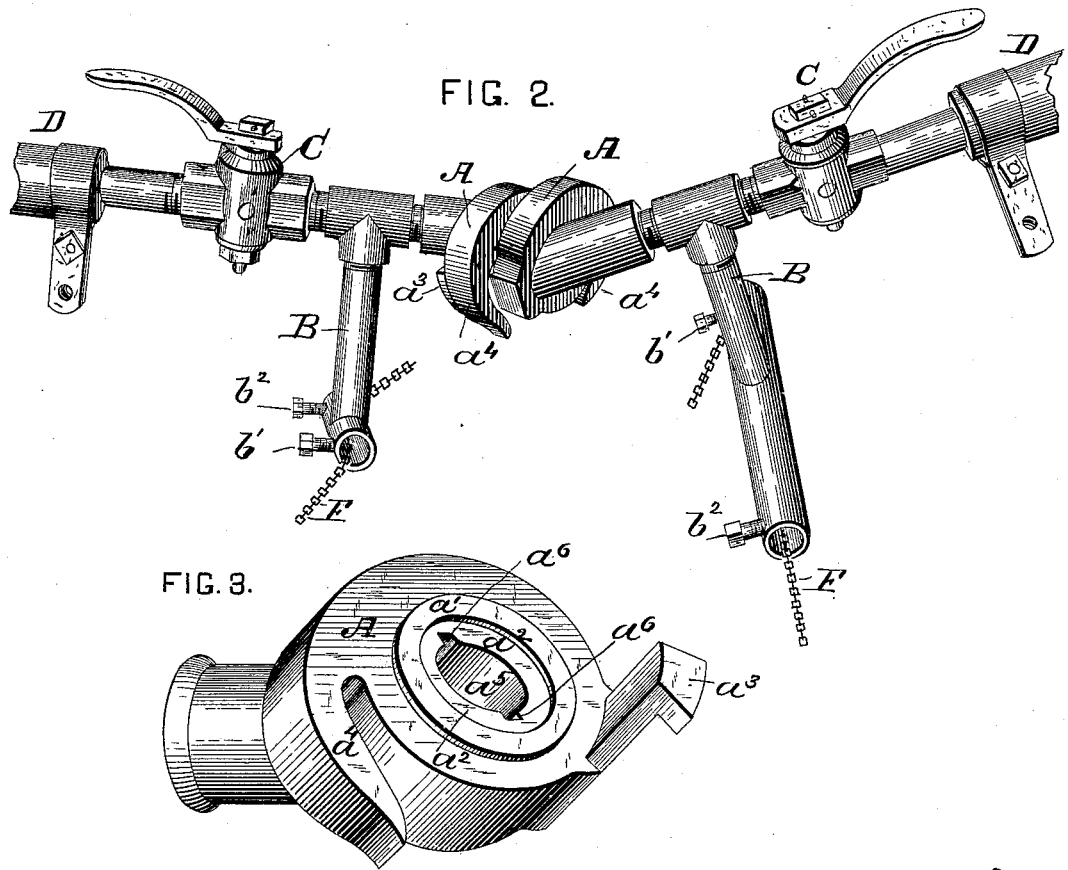
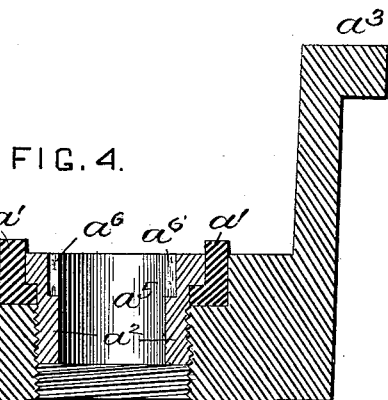
ATTEST.
J. Henry Kaiser
Joseph C. Stack
INVENTOR.
Fred Du Montier
By Geo. B. Shepard,
Atty.

UNITED STATES PATENT OFFICE.

FRED DU MONTIER, OF OGDENSBURG, NEW YORK.

PIPE-COUPLING AND COUPLING ATTACHMENT FOR RAILWAY-CARS.

SPECIFICATION forming part of Letters Patent No. 482,304, dated September 6, 1892.

Application filed December 8, 1891. Serial No. 414,434. (No model.)

*To all whom it may concern:*

Be it known that I, FRED DU MONTIER, a citizen of the United States of America, and a resident of Ogdensburg, in the county of St. Lawrence and State of New York, have invented certain new and useful Improvements in Pipe-Couplings and Coupling Attachments for Railway-Cars; and I do hereby declare that the following is a full, clear, and exact description of the invention, such as will enable others skilled in the art to which it appertains to make and use the same.

The object of my invention is to provide means for expeditiously uniting the ends of the air-brake or steam pipes carried on each car of a series, where such pipes are used, without requiring the brakeman to go between the ends of the cars—a practice, as is well known, especially dangerous in the case of freight-cars as ordinarily constructed—and also to provide a coupling that will automatically uncouple without injury to the coupling should any of the series of cars break apart.

In the accompanying drawings, Figure 1 is a perspective view of the end of an ordinary freight-car with my improved pipe-coupling and coupling attachment in position thereon. Fig. 2 is a side view in perspective of a pair of my improved pipe-couplings in position when coupled, showing more clearly the details of construction, but omitting the attachment to the car. Fig. 3 is a perspective view of the head of my improved pipe-coupling, showing the face thereof; and Fig. 4 is a longitudinal sectional view of the coupling-head of my improved pipe-coupling, showing the manner of constructing and placing the packing for the joint and removably securing the same to the face of the coupling.

Like letters of reference indicate corresponding parts in all the figures.

Referring to the accompanying drawings, G (shown at Fig. 1) represents the end of an ordinary freight-car, across the face of which is horizontally attached by cleats the metal pipe E, having both ends bent in arc form to facilitate the passage therethrough of the chain F, the ends of which are secured by means of the set-screws $b'$ and $b''$ within the hollow arms of the T-iron B, as shown, the main stem of said T-iron being secured to the under side of the line of piping and at right angles thereto. To the outer end of said line of piping is secured the coupling-head A, and interposed in the said line of piping, on the other side of said T-iron connection, is placed the stop-cock connection C, by means of which the opening in the said pipe may be closed when the coupling is disconnected. To the inner end of said stop-cock connection C is connected the pliable hose or piping D now in ordinary use in connection with air-brake or steam-heating car systems, and to the other end of this flexible hose are connected the pipes running under the car as ordinarily employed. As will be readily observed, this gives a continuous line of communication for the steam or air from said pipe under the car through the opening shown in the coupling-head at Fig. 4.

In the coupling-head, as shown more particularly at Figs. 2, 3, and 4, I construct the face of the coupling at an angle of about ninety degrees to the axis of the line of piping and provide the same with an elastic annular packing $a'$, held in position so as to project slightly above the face of the coupling-head by a metal annular keeper $a^2$, provided with a male screw at its lower end, adapted to engage with the female screw in the body of the coupling-head A, as shown at Fig. 4, and the slots $a^6 a^6$ on the inner surface of said keeper $a^2$ for the purpose of affording engagement with an ordinary screw-driver for forcing the said keeper $a^2$ into the position shown or removing it therefrom to replace said packing $a'$. This keeper $a^2$ has a circumferential annular shoulder on its upper end, which engages with an internal annular rim on the lower end of the packing $a'$, by which means the said packing is held securely in place, as shown.

On the outer extremity of the coupling-head A and extending at right angles to the face thereof I form the lug $a^3$, having an enlarged head bent outwardly and at right angles thereto and adapted to engage with the horn $a^4$ upon the opposite side of the companion coupling-head, such companion coupling-head being a duplicate of the one herein described. This horn $a^4$ is made slightly tapering both on its outer circumference and side opposite its face for the purpose of wedging together the faces of the respective couplings by means of the engagement of these horns with the lugs $a^3$ and the heads on said lugs when the said horns and lugs are rotated toward each other in effecting the coupling, as hereinafter explained.

It will be observed that in connection with the coupling-head shown I construct one arm of the T-iron B longer than the other end, so that the jarring of the car when in motion will have a tendency to twist the coupling tighter together because of the weight of the coupling-head being supported by the said T-iron and chain, as shown. This tendency is further increased by the weight of the stop-cock and pliable hose acting upon the said lugs and horns through the leverage of the connections shown and bearing on the supporting-chain as a fulcrum. It is also apparent that when the leverage is thrown in the opposite direction by pulling one pair of said supporting-chains horizontally from the other pair, as would be done when the cars supporting the apparatus were drawn apart, the said lugs would be forced from engagement with the said horns and the coupling would fall apart, and this would occur without dragging the edge of one packing across the other, as would happen if the face of the coupling-head were set parallel with the line of motion of said cars.

My object in constructing the arms of the T-iron B hollow, with the set-screws $b'$ and $b''$, as shown, is to allow of adjusting by their use the length of the supporting-chains F; but it is apparent that this object may be accomplished by other known means commonly employed for a like purpose. It is also apparent that the chain F may be replaced by a flexible wire rope or other cord having the requisite strength and flexibility, and the hollow pipe E may be made semicircular or raised or depressed in the center to conform to the construction of different cars, and its manner of attachment to the car may be by any of the various means commonly employed for a like purpose. It will be further observed that by throwing the center of gravity on the coupling end of the said supporting T-iron by either weighting the coupling-heads or carrying them farther from the connection with the T-iron the position of the T-iron connection may be reversed and the supporting T-irons placed above the line of the coupling-pipe and yet be automatically uncoupled when the cars supporting the same are drawn apart.

In operating my said improved pipe-coupling and coupling attachment, it being first attached to the cars, as shown, and the cars fastened together, so that they will not draw apart, and the brakeman or operator being at either side of the opening between the cars, he grasps the part of the chain attached to each pipe-coupling on the side nearest him, and thereby draws both said coupling-heads to that side of the cars. He then grasps one of the said coupling-heads in either hand and places the faces thereof together, so that the lugs $a^3$ engage with the inner edges of the horns $a^4$ on each coupling-head, and fastens them together by a slight right-handed twist. He then opens the stop-cocks C C and restores the said coupling-heads to their normal position by grasping and pulling the chains F F through the pipes E E until the said coupling-heads are supported by said chains midway from either side of the cars. To uncouple the said coupling-heads, they are drawn to either side in the same manner as above explained, the stop-cocks C C turned to close the ends of the pipes, and the coupling-heads disconnected by a left-handed twist.

The supporting-chains F F and pipe E E above described can be used with any of the known forms of coupling-heads when connected with the flexible pipe D described. For the purpose of enabling the brakeman to couple and uncouple the same without going between the cars and in case the tilting action of the T-iron above explained should not be required for automatically uncoupling said chains could be attached directly to the coupling-head by any of the means usually employed for such purpose.

Having now described my improved pipe-coupling and coupling attachment for railway-cars and the manner of operating the same, what I claim as my invention, and desire to secure by Letters Patent of the United States, is—

1. In a pipe-coupling and coupling attachment for railway-cars, the combination, with a flexible pipe, of a coupling-head thereon, and a pipe secured to the car, and a supporting chain or rope passing freely therethrough and having its ends attached to the coupling-head.

2. In a pipe-coupling and coupling attachment for railway-cars, the combination, with a flexible pipe, of a coupling-head thereon, and a pipe with curved ends secured to the car, and a supporting-chain or rope passing freely therethrough and having its ends attached to the coupling-head.

3. In a pipe-coupling and coupling attachment for railway-cars, the combination, with a flexible pipe, of a coupling-head thereon, a T-iron having its stem secured to said pipe at or near the coupling-head, a pipe secured to the car, and a supporting chain or rope passing freely therethrough and having its ends attached to the arms of the T-iron.

4. In a pipe-coupling and coupling attachment for railway-cars, the combination, with a coupling-face set at an angle to the line of piping, of an elastic annular packing removably secured within the coupling-head, and upon the rear edge of the face of said coupling-head a wedge-shaped horn, and on the opposite side of said face a projecting headed lug adapted to engage with a similar horn on a companion duplicate coupling-head, substantially as herein shown and described.

FRED DU MONTIER.

Witnesses:
JOHN F. DERENNE,
JOSEPH HACKETT.